(12) United States Patent
Bhogal et al.

(10) Patent No.: US 7,424,669 B2
(45) Date of Patent: Sep. 9, 2008

(54) AUTOMATIC BIBLIOGRAPHICAL INFORMATION WITHIN ELECTRONIC DOCUMENTS

(75) Inventors: Kulvir Singh Bhogal, Fort Worth, TX (US); Nizamudeen Ishmael, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 10/759,930

(22) Filed: Jan. 16, 2004

(65) Prior Publication Data

US 2005/0160363 A1 Jul. 21, 2005

(51) Int. Cl.
G06F 17/00 (2006.01)
(52) U.S. Cl. ...................... 715/230; 715/255
(58) Field of Classification Search ................ 715/530, 715/512, 230, 255
See application file for complete search history.

(56) References Cited

U.S. PATENT DOCUMENTS

| | | | |
|---|---|---|---|
| 6,282,548 B1* | 8/2001 | Burner et al. | 707/104.1 |
| 6,493,731 B1* | 12/2002 | Jones et al. | 715/501.1 |
| 6,553,373 B2 | 4/2003 | Boguraev et al. | |
| 2003/0002086 A1* | 1/2003 | Thomason | 358/448 |
| 2003/0065642 A1* | 4/2003 | Zee | 707/1 |
| 2003/0229858 A1* | 12/2003 | Keohane et al. | 715/526 |
| 2004/0139400 A1* | 7/2004 | Allam et al. | 715/526 |
| 2004/0243634 A1* | 12/2004 | Levy | 707/104.1 |

OTHER PUBLICATIONS

Uzuner, Ozlem, et al, "Copyrights and Access-Rights: Content and Expression-Based Copy recognition for intellectual Property Protection", Proceedings of the 3rd ZCM Workshop on Digital Rights Management DRM '03, Oct. 2003, pp. 103-110.*
Kobayashi, Mei, et al, "Information Retrieval on the Web", ACM Computing Surveys (CSUR), vol. 32, Issue 2, Jun. 2000, pp. 144-173.*
Microsoft Word 2000, Copyright 1999, Microsoft Corporation, Figures 1-2.*
"EndNote: Biographies and Now Manuscripts Made Easy", Thomson ISI, 2002, downloaded from www.endnote.com archived on Jun. 20, 2003, pp. A-D, i-xvi, and 1-523.*
Endnote . . . Bibliographies Made Easy, www.endnote.com/enhome. asp, © 2003 ISI ResearchSoft, last modified on Nov. 26, 2001.
UCLA Biomed Library, Louise M. Darling Biomedical Library, http://unitproj.library.ucla.edu/biomed/bibsoftware/bibcompare. cfm , Jun. 19, 2003.

* cited by examiner

Primary Examiner—Laurie Ries
(74) Attorney, Agent, or Firm—Herman Rodriguez; Dillon & Yudell LLP (57) ABSTRACT

A method that enables automatic retrieval and transfer of bibliographical information whenever content is copied from a web page. During creation of a web page, the meta data defining each independent portion of the content is linked via paired comments or meta tags to bibliographical information associated with the content. When a person accesses the web site and copies the content from the site, the bibliographical information is automatically appended to the content. If that content is then pasted into a different document, e.g., within a word processing application, the bibliographical information is automatically transferred to a location for such information within the document. Also, if the content is saved, the bibliographical information is saved along with the content.

15 Claims, 7 Drawing Sheets

AUTOMATIC BIBLIOGRAPHICAL INFORMATION WITHIN ELECTRONIC DOCUMENTS

BACKGROUND OF THE INVENTION

1. Technical Field

The present invention relates generally to electronic documents and in particular to copying electronic documents on computer systems. Still more particularly, the present invention relates to a method and system for automatically providing bibliographical information during the copying of an electronic document.

2. Description of the Related Art

Creating non-fictional works, such as research documents, that include information, facts, or data from other sources often requires the compiler of the work to acknowledge or give credit to the source(s) from which the information is obtained. It is also a legal requirement under copyright laws for scholars and other copiers/compilers to provide bibliographical information when they compile content from other sources in order to acknowledge the correct source (or author) of the information and to allow interested readers to quickly locate and access the source(s).

Traditionally, copied/cited content was obtained from a written source, (e.g., book, magazine, or thesis) and the compiler had to painstakingly locate and record the bibliographical information accompanying the content to avoid being discredited for plagiarism or even worse, being sued for copyright infringement. In today's Internet-connected environment, a vast majority of information required for creating non-fictional works and/or compiling content for a research project or paper can be found on the Internet. Millions of people surf the Internet each day looking for specific content that is available on web pages composed by a web page editor. Of these surfers, a substantial number occasionally copy portions of the content from the web site and paste that information into a different location/application, such as a word processing editor.

When copying/pasting from the Internet, particularly when doing research, the copier (similar to the compiler) often cites the online sources used. As with the traditional research methods, conventional Internet-based research requires the copier of the content to manually locate/retrieve and record the bibliographical information (to the extent the information is available on the web site). Several limitations are built into conventional online research and content retrieval/transfer from a web page to a word processing editor application. First, the bibliographical information may not be actually provided with the content and the copier may be limited to citing the web page URL (Universal Resource Locator) rather than the actual source/author of the information and publication date, etc. Second, even if the information was displayed along with the content, the copier is forced to actually copy/type that information into his document being created on the word processing editor, which necessarily involves some manual effort and "academic" honesty of the copier. Often, the copier takes the lazy approach and simply records the web page URL or omits the bibliographical information all together.

The present invention recognizes these limitations and provides a method, system, and computer program product that enable automatic retrieval and transfer of bibliographical information whenever content is copied from a web page.

SUMMARY OF THE INVENTION

Disclosed is a method, system, and program product that enable automatic retrieval and transfer of bibliographical information whenever content is copied from a web page. During creation of a web page, the meta data defining each individually sourced portion of the content is linked via paired comments or meta tags to bibliographical information associated with the portion of the content. The bibliographical information ranges from the author of the content (who may be the creator or owner of the web page), the date of publication, name of publisher or publishing company (where applicable), a link to the original source (if copied from another location), and other relevant data.

When a person accesses the web page and copies content from the site, the bibliographical information is automatically appended to the copied content. If that content is then pasted into a different document, e.g., within a word processing application, the bibliographical information is automatically transferred to a location for such information within the document. This location may be in the footnotes section of that page and/or at the end of the document. Similarly, if the selected content is saved to a location, the bibliographical information is stored along with the content. In this way, automatic transfer of the bibliographical information occurs without requiring additional efforts by the copier.

In one embodiment, the pasted content is tagged with a footnote styled symbol indicating the identifier (ID) of the bibliographical information associated with the content. Also, clicking on the ID may take the copier or other reader of the copied content directly to the correct bibliographical information. In another embodiment, the copier is provided with a selection window requesting the copier to select whether to include the bibliographical information for content that has just been pasted into the document. A related embodiment provides a child window that enables editing of some portions of the bibliographical information immediately following the paste operation.

Enhancements are made to both the word processing editor and the web page editor to enable the features of the invention. With the web page editor, additional selections are provided that enable the web page designer creator to identify an author for the web page, select what type of bibliographical information to tag to the content, and specify the restrictions with regards to removal of the bibliographical information during subsequent copy and paste to a word processing editor. In the latter implementation, when absolute copyright restrictions are provided along with the content, a user is prevented from completely removing all bibliographical information from within the document on the word processing editor unless the content is deleted. This protects the copyright owner from having portions of his work buried in a larger document without being given credit for his creation. Enhancements to the web browsers are also provided to enable the browser to identify the bibliographical information from within paired comments surrounding the content. In another implementation, modifications are made to conventional browsers to enable the browser to recognize specific meta tags linked to the content as providing a link to bibliographic information.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention provides a method by which a copier of content from a web page is automatically provided with bibliographical information specified by the author of the web page, such as meta information about who the page author is, what resource is being copied, publishing date, etc. During creation of a web page, the meta data defining each individually sourced portion of the content is linked via paired comments or meta tags to bibliographical information associated with the portion of the content. When the copier later pastes content from the web page into a word-editing program, e.g., Microsoft Word®, the copier is presented with a prompt to accept and/or edit the accompanying bibliographic information. The user can then opt to add and/or edit the bibliographic information to the bibliography section of the document.

Figure 1:
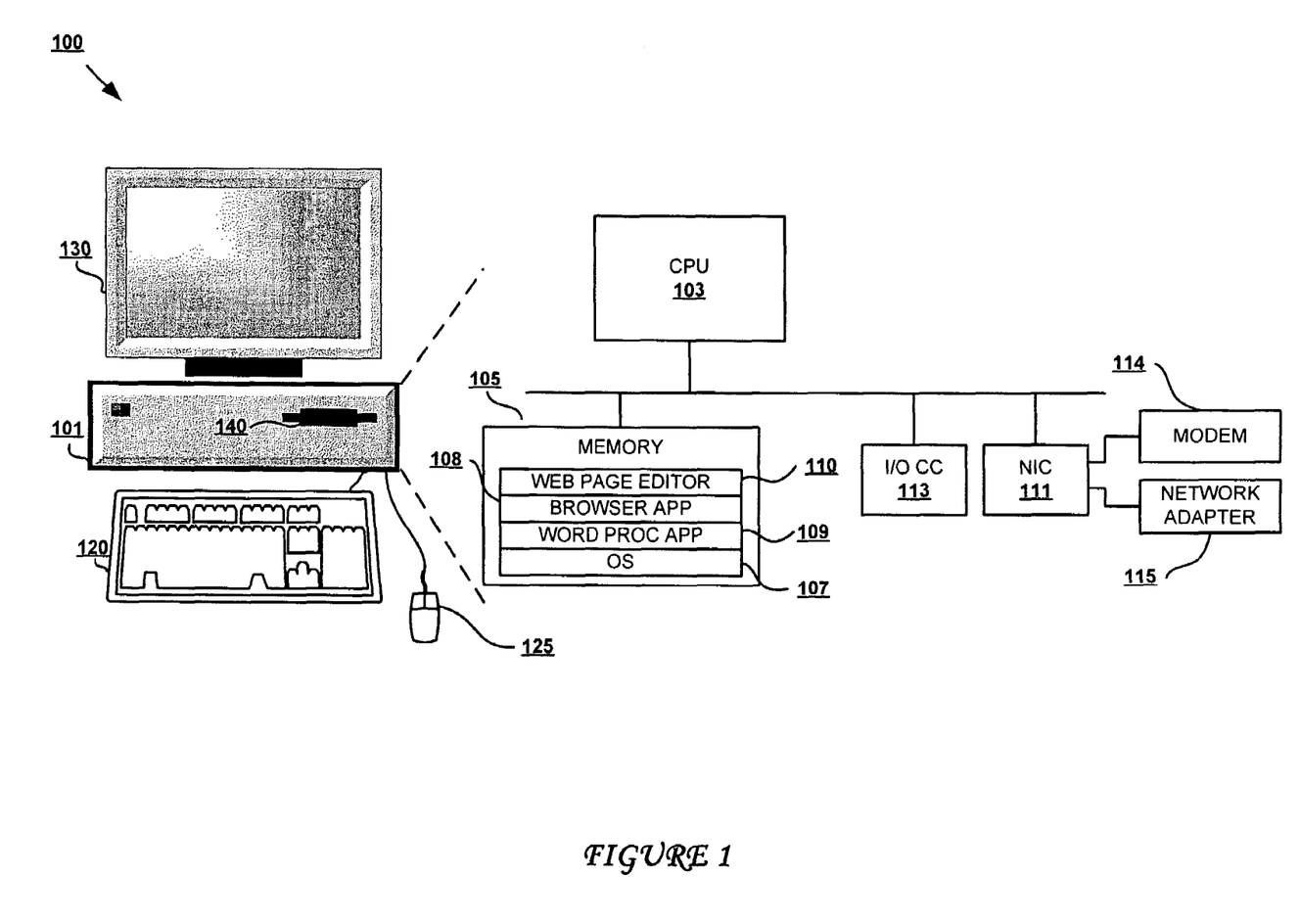
FIG. 1 illustrates a computer system, within which the various features of the invention may advantageously be implemented.

With reference now to the figures, and in particular FIG. 1, there is illustrated the basic components of a computer system within which the personal computer (PC) and/or web server features of the invention may be implemented. Computer system 100 comprises a Central Processing Unit (CPU) 103 and memory 105 housed in a system unit 101. Stored within memory 105 are the operating system (OS) 107 and software applications, including browser application 108 and word processing application 109. In the illustrative embodiment, software applications also comprise web page editor 110. However, in another implementation, the web page editor functionality is provided as a utility within word processing application 109.

In addition to memory 105 and CPU 103, computer system 100 also includes an input/output (I/O) channel controller (CC) 113 and a network interface controller (NIC) 111. I/O CC 113 is utilized to control I/O devices (external to the system unit) such as keyboard 120, mouse 125, and display monitor 130. Display monitor 130 is a screen on which a graphical user interface (GUI) displays icons or other selectable mechanisms (menu options, etc.), which allows a user to view and interact with the various software applications executing or compiling system.

NIC 111 is utilized to provide computer system 100 with network access capability via a modem 114 and/or network adapter 115 or other form of network accessible medium, such as wireless, broadband connections, etc. Computer system 100 connects to other systems via an electronic network, such as a wide area network (WAN) or the Internet. Browser application 108 enables the user of computer system to interface with a web site on a server that is connected to computer system via the network.

Although described with specific components, the computer system of FIG. 1 is provided solely for illustrative purposes and the particular configuration and components provided are not meant to be limiting on the invention.

Figure 2:
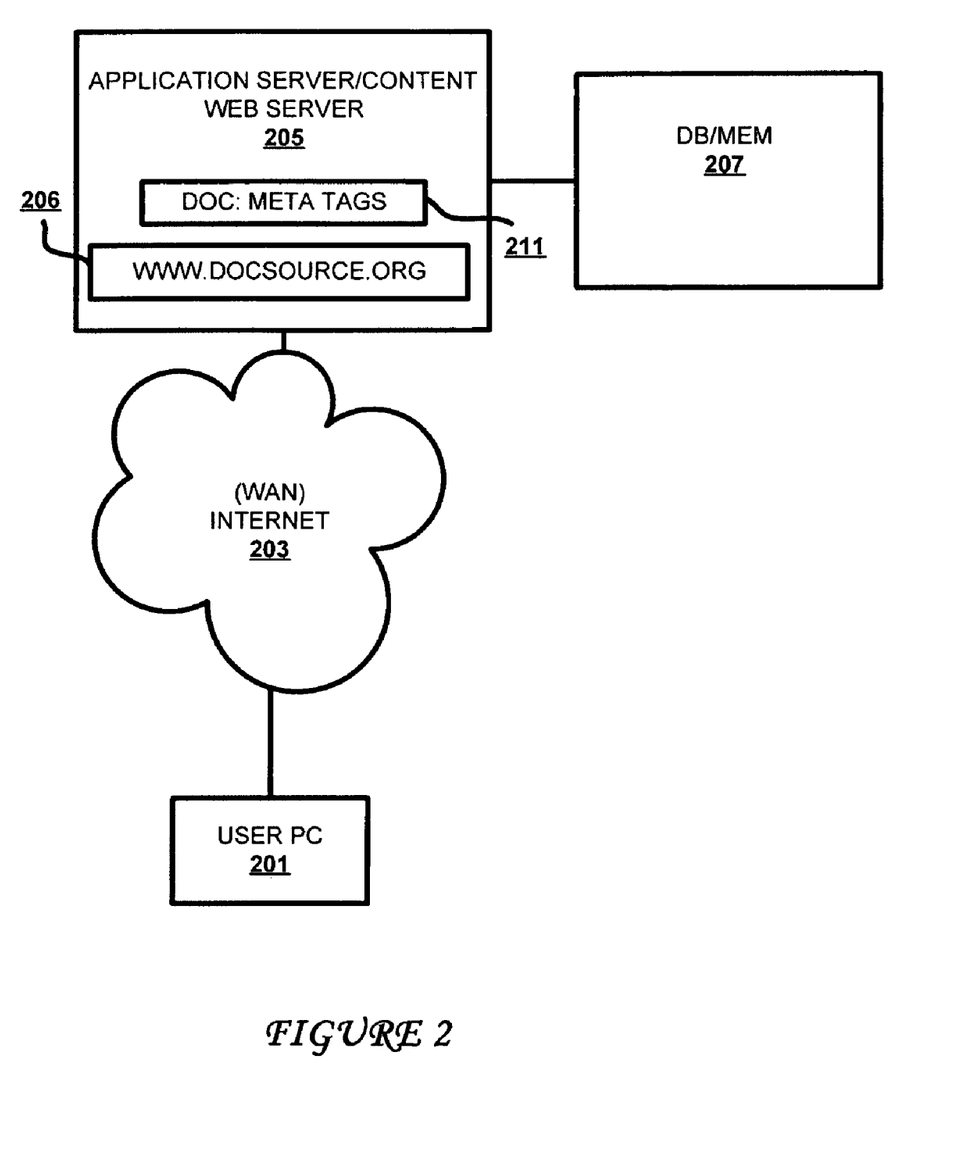
FIG. 2 is a high-level block diagram of a computer network linking a web server with a user's personal computer in accordance with one implementation of the present invention.

Referring now to FIG. 2, there is depicted a basic representation of an Internet-based computer network. Internet 203 is depicted as a network cloud with connections to user's personal computer (PC) 201 (representing the user's or copier's terminal) and content web server 205 and associated database (or memory) 207. Content web server 205 is a computer system, such as computer system 100, comprising a processor, memory, OS and server software that enables the display of web pages. Content web server 205 also comprises multiple web documents 211 made up of meta data and associated meta tags. Content web server 205 has a corresponding Internet Protocol (IP) address and universal resource location (URL) 206 that identifies the location of the web site to persons accessing the web site via the Internet 203. For example, Content web server 205 may be accessible via Internet address (or URL) DocSource.org. Within the database 207 are data utilized to generate content on-the-fly.

The user's PC 201 comprises OS and web browser software stored in memory and utilized for accessing web sites on Internet 203, such as the site associated with Content web server 205. The user's PC 201 is utilized by the copier to access the Internet 203 and to interact with Content web server 205. Also, the user's PC 201 has a unique IP address that differentiates itself from the PC of another user. Access to Content web server 205 requires the user of the user's PC 201 to enter the universal resource location (URL) of the content web server 205 in a web browser application running on the user's PC 201.

Actual communication within the Internet 203 may be handled via Transmission Control Protocol/Internet Protocol (TCP/IP) or other transmission protocol, which allows information to be transmitted to and from addresses assigned to each device via the Internet. Those skilled in the art appreciate that the illustrated Internet 203 may in fact be represented by a more complex network of servers and clients and sub-networks, and that the illustrative Internet-based network is provided solely for illustrative purposes and not meant to be limiting on the invention.

Figure 3A:
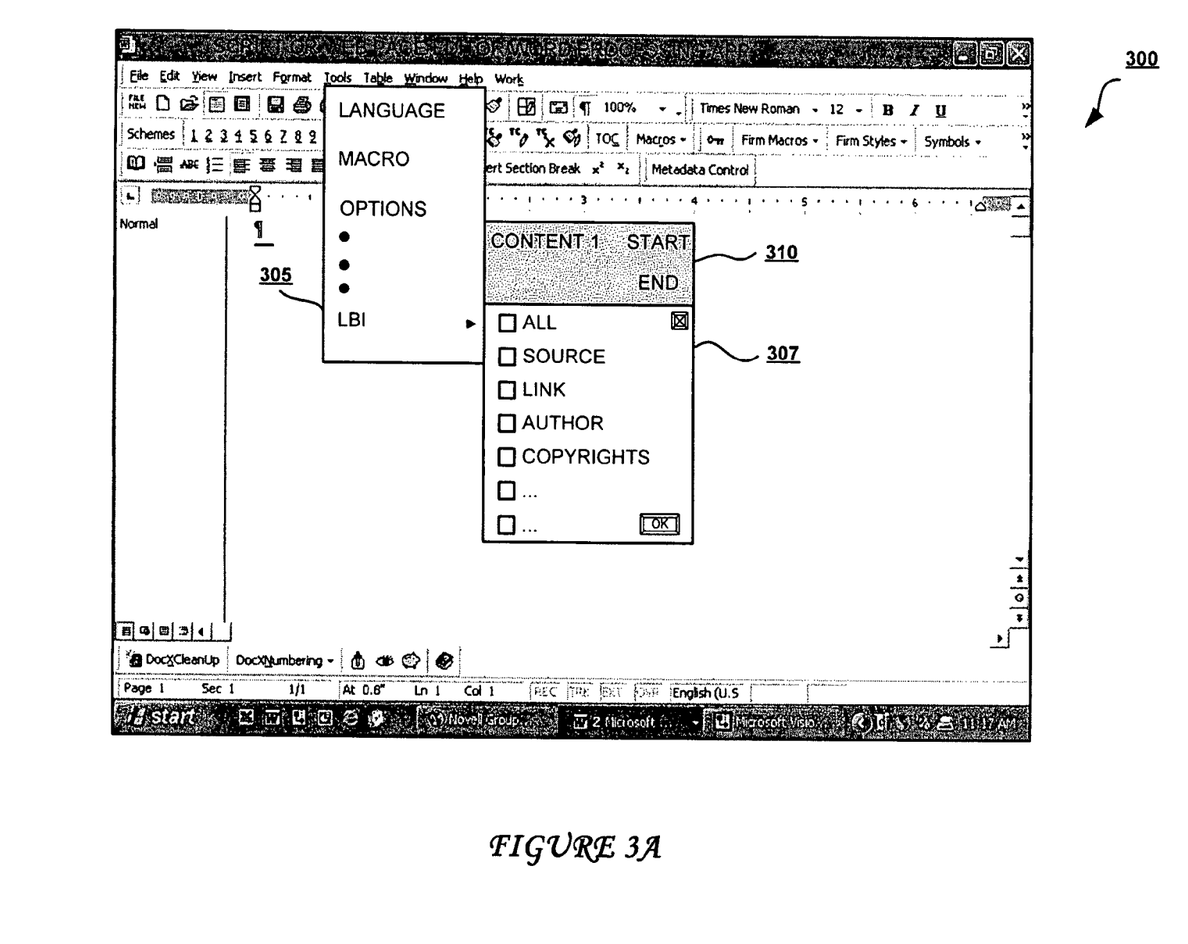
FIG. 3A is a graphical user interface (GUI) of a web page editor with which biographical data may be included within paired comments or meta tags linked to the content of a web page according to one implementation of the invention.
Figure 3B:
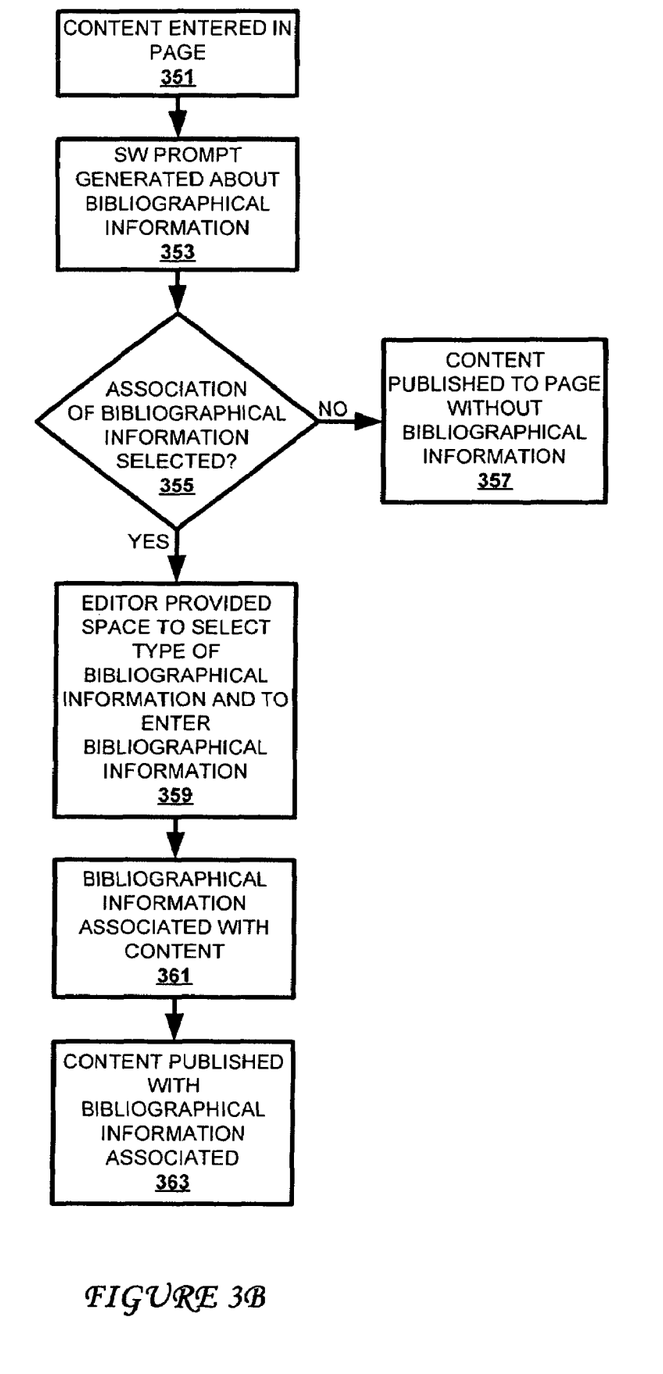
FIG. 3B is a high level flow chart illustrating the process by which an author or web site creator associates bibliographical information with content on the site in accordance with one embodiment of the invention.

Turning now to FIG. 3A, there is illustrated a GUI of a web page editor (hereinafter referred to as editor GUI) utilized to create a meta data file that represents the web page content. Editor GUI 300 comprises similar selectable options and icons as a standard word processing GUI and a description of these GUI features is not relevant to an understanding of the invention. Within editor GUI 300 is content 310, indicated by a CONTENT1 label and a start and end delineator. The flow chart of FIG. 3B illustrates one embodiment of the process by which the bibliographical information is created and associated with the relevant content. In a first implementation, after a content creator or compiler (i.e., web page creator) provides content as indicated at block 351, the creator is prompted by the software to enter bibliographical information desired to be associated with the content as shown at block 353. This prompt may occur when the creator saves the page.

A determination is made at block 355 whether the creator elects to associate bibliographical information with the content. When the creator does not wish to associate any bibliographical information, the content is published without such information, as shown at block 357, and thus no bibliographical information is provided when the content is later copied. If, however, the creator elects to include the bibliographical information, the creator is provided with space within the page to enter the bibliographical information as indicated at block 359. As is described below, the creator may enter the bibliographical information within comments and/or as meta data linked to the content. The bibliographical information is associated with the content as shown at block 361, and the content is published with the bibliographical information associated with it as shown at block 363.

In one embodiment, the editor application is enhanced to include a selectable option for linking bibliographical information (LBI) to entered content. As shown in FIG. 3A, the pull down menu of the tools option includes an LBI selection 305. When LBI is selected, a second list of options 307 is provided that enables the editor to determine the specific type of bibliographic information to associate with the content. Thus, the editor may decide to associate one or more of the available bibliographic information, including the author, the source (name of text, website, etc.), hot link to the source, copyright information/insignia, etc. Once the editor completes the selection, that information is then entered and stored as meta data along with the content. Notably, a single document may contain multiple bibliographic items. For example, each paragraph (or sentence) in the web page may need to be attributed to a different source or author. Thus, the granularity of the information provided in the web page content determines the number of different bibliographical data required. Wholesale copying or sectional copying of the web page would then provide a pasting application with bibliographical information associated with the copied content.

One implementation of the invention involves providing the bibliographical data within a comment (rather than as a meta tag) within the source file of the web page. Each individual portion of the content is preceded by a beginning comment that includes: (1) an indication that the comment is bibliographical in nature; and (2) actual bibliographical data for the following content. An end comment is then placed after the individual content. This implementation requires an enhancement to current browser application to enable the browser to recognize both the beginning and end comments and to automatically copy the comments when the content is selected for copying. The comments are not displayed on the browser and only utilized for providing bibliographical information for the content both to a copier of the content and a person reading the source file. Because the comments operate in pairs, other discussion of the comments herein reference the beginning and end comment pairs as paired comments.

In one embodiment, the editor is provided the option of entering the name of the "author" to be associated with original content on the web page. This feature may be provided as one of the pull down options in the file menu, for example. This enables original content to be automatically tagged with the web page designer/creator or other person such as the web page owner.

Figure 4:
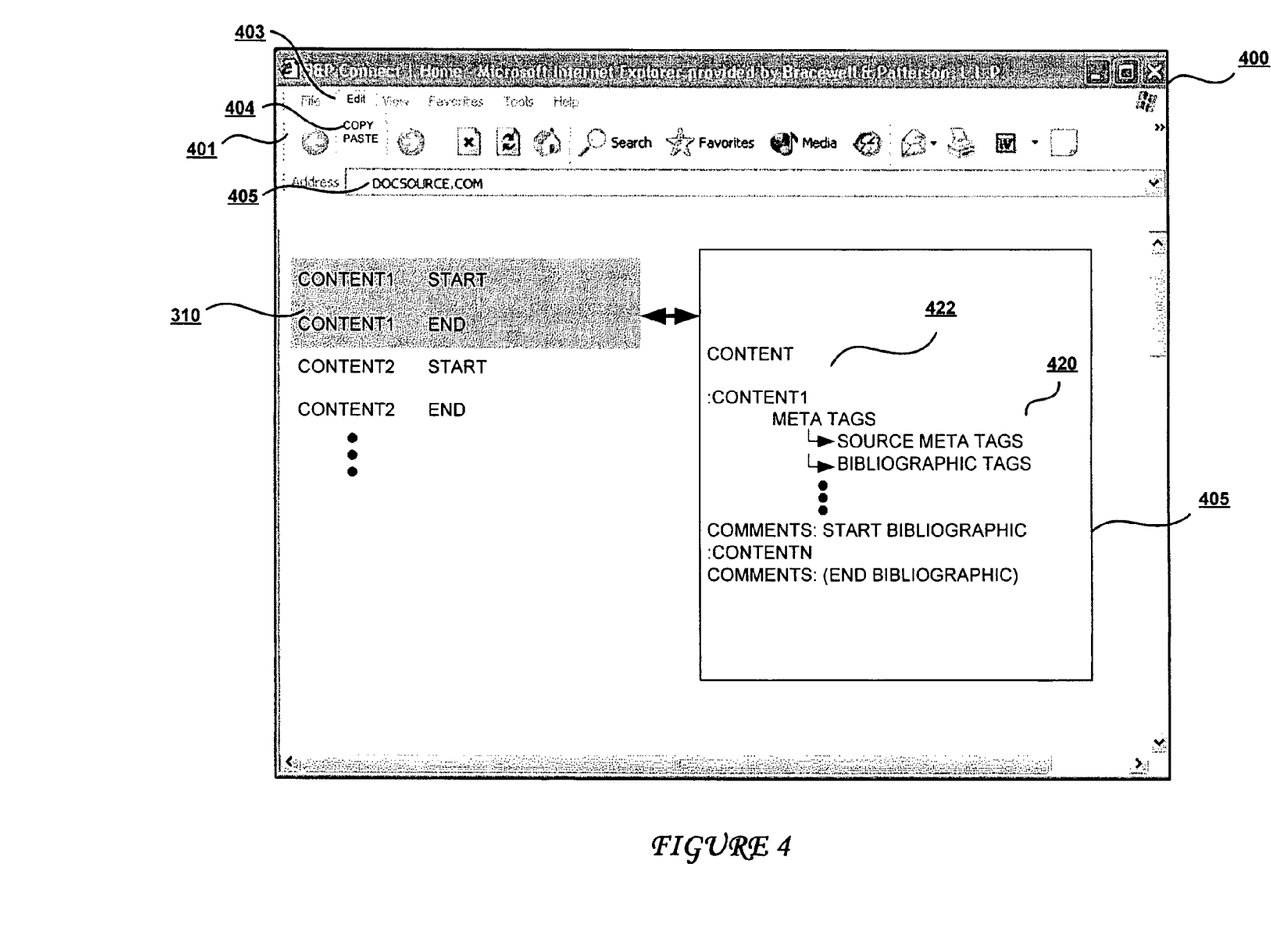
FIG. 4 is a GUI of a web browser displaying content of a web page that is being copied in accordance with one implementation of the present invention.

FIG. 4 is a GUI of a web browser from which the user copies the content of a web page. As shown, web browser GUI 400 includes several of the conventional selectable options and icons, many of which are not relevant to the description of the invention. Web browser GUI 400 comprises an address field 405 within which the URL of the displayed web page is provided. In the illustrative embodiment, web page 405 associated with URL "DocSource.org" is displayed. The web page 405 comprises content, e.g., Content1 310. In the illustrated embodiment, Content1 310 has associated bibliographic identifiers 422 within source file 420 of the web page 405. In the present implementation, two types of bibliographic identifiers 422 may be utilized within the source file 420. The first type of bibliographic identifiers 422 is a pair of comments that are placed immediately before and after the content. Within the beginning comment is an indication that the following content is related to the bibliographical information provided within the comment. The end comment includes and indication of the end of the content affiliated with the bibliographical information in the preceding comment. The comments and content are all embedded in the source file and are transferred as part of the content.

In a second implementation, meta tags linking the bibliographical information are provided within the source file with the meta data of the particular content. For both implementations, the web browser being utilized to display the content is designed with the ability to read and recognize the bibliographical identifiers and respond accordingly when the content is copied from the web page.

Content1 310 is selected for copying utilizing one of several I/O methods, such as placing the mouse pointer over the start of Content1 310 and dragging the pointer to the end of Content1 310 to highlight Content1 310. Content1 310 is thus shown highlighted (as compared to Content2). Those skilled in the art are familiar with the point and drag mouse operation by which Content1 310 may be highlighted for copying. Once Content1 310 has been highlighted, the user may select the copy feature 404 from the edit menu option 403. Alternatively, the user may select "CTRL C" to copy the highlighted section, as is currently done as a shortcut function for copying information.

Figure 5:
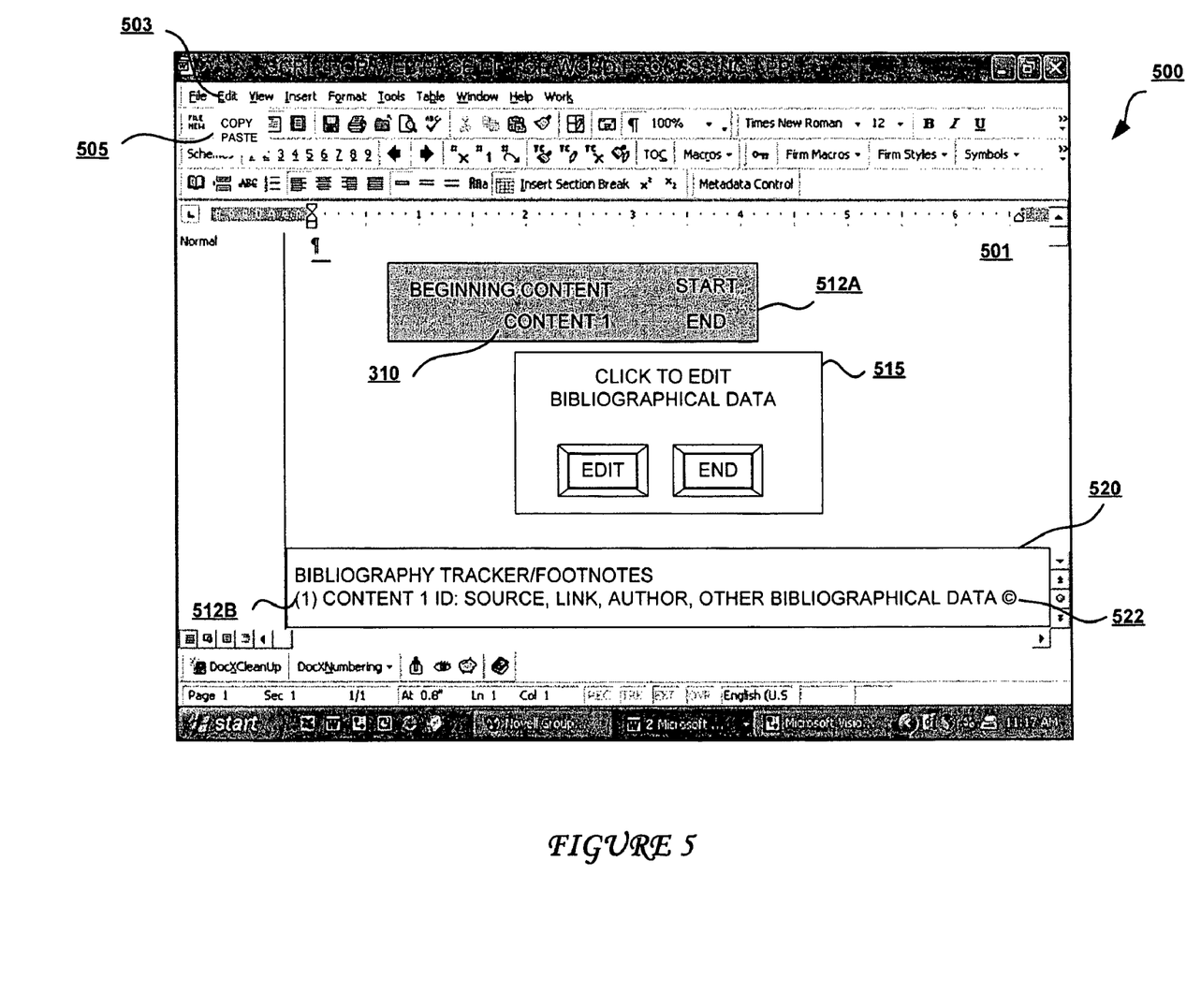
FIG. 5 is a GUI of a word processing application within which the content copied from FIG. 4 is pasted along with bibliographical information according to one embodiment of the present invention.

FIG. 5 illustrates a GUI for a document editor, which may be a standard word processing application, such as Microsoft Word®, enhanced with bibliographical information tracking functionality. In one implementation, document editor GUI 500 is provided with a web page editor and, as such, may be utilized to complete similar functions as web page editor GUI 400. Again, only relevant ones of the selectable icons and options are described. Document editor GUI 500 includes a workspace 501, within which a document is typed or created by a user. Illustrated within workspace 501 is beginning content, followed by Content1 310. In the illustrative embodiment, Content1 310 is pasted into the workspace 501 by selection of paste option 505 from edit pull down menu 503.

In the illustrative embodiment, document editor GUI 500 also comprises bibliography-tracking section 520 within which bibliographic information associated with Content1 310 and other content are stored. When the copier pastes Content1 310 into workspace 501, the associated bibliographic information is automatically copied to bibliography-tracking section 520. Also, the Content1 310 is tagged with a bibliography pointer 512A and the corresponding bibliographic data 522 is labeled with a similar tag 512B. In one implementation, selection of the pointer 512A automatically displays the bibliographic information. Displaying the bibliographical information 522 may include highlighting the information within bibliography section 520 or extending the information across the workspace 501 adjacent to Content1 310. The actual location of the bibliography-tracking section may vary, depending on implementation. In one implementation, all bibliographical information 522 is placed at the end of the document. Additionally, different formats may exist for displaying the bibliographic information. The copier is provided the capability of deciding a specific format for the document and the associated bibliographic information. When the content is pasted into the document, the document editor automatically transforms the bibliographic data into the format selected by the copier.

In one embodiment, a pop up child window is displayed when the copier pastes content that has associated bibliographical data into the workspace 501. For example the pop up window may display the following message: "You are pasting from a source that provides bibliographic information. Would you like to add this bibliographic information to your bibliography section?" As shown in FIG. 5, the pop-up child window 515 serves as a notification to the user that the bibliographic information was copied to the bibliography-tracking section 520, and provides the copier with the option to edit or customize the bibliographical data. In a related embodiment, the copier may elect to delete the bibliographic data as unnecessary. With this implementation, however, the originating author may make certain types of bibliographic data undeletable. That is, the copier is not able to keep the copy of the content without the bibliographical data attached, and deleting the latter information leads to an automatic deletion of the content. Authors of copyrighted works may utilize this feature to protect their work from being copied directly. A copier, who does not wish to give credit to the original author has to invest the time and effort to type in or recreate the content.

Figure 6:
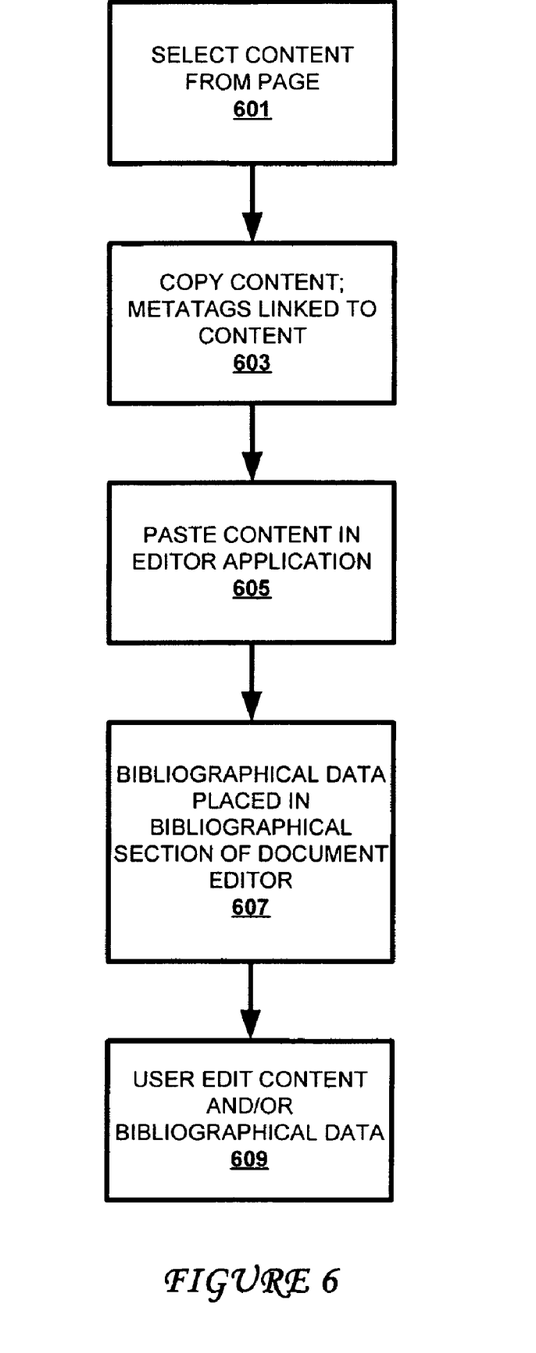
FIG. 6 is a high level flow chart illustrating the process of copying and pasting content from a web page to a word editor according to one implementation of the present invention.

With reference now to the flow chart of FIG. 6, there is illustrated the process by which the copying and pasting of content and bibliographic information is completed. The process begins when the user selects the content from the web page as indicated at block 601 and copies the content as shown at block 603. Copying the content results in a copying of the comments or meta tags which contain bibliographic information that is linked to the content. The user then pastes the content in the document editor being used to collect the content, as provided at block 605. When the content is pasted, the bibliographical information is placed in the biographical-tracking section of the document, as shown at block 607. The user may then edit the content and/or the biographical data as indicated at block 609.

It is important to note that while the present invention has been described in the context of a fully functional data processing system, those skilled in the art will appreciate that certain elements of the method of the present invention are capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. For example, although described in the context of text documents, the invention is also equally applicable to copying images, such as embedded pictures and graphics, from a web site or network. It is therefore contemplated that such modifications can be made without departing from the spirit or scope of the present invention as defined in the appended claims.

What is claimed is:

1. In a data processing system having a processor and a memory with code residing therein and executed by the processor to implement a method for automatically providing bibliographical information associated with copied content, said method comprising:

associating bibliographical information with content on an electronic page;

responsive to a copy function performed on said content, creating a copy of said content and dynamically including the bibliographical information within the copy of said content, wherein said copy is created with the bibliographical information linked thereto;

associating a deletion of the bibliographical information to a concurrent deletion of the copy of the content, wherein the deletion of the bibliographical information triggers a concurrent deletion of the copy of the content; and responsive to an output of the copy of the content to an output device, automatically outputting the bibliographical information along with the copy of said content.

2. The method of claim 1, further comprising:

responsive to a later paste function performed on said copy of said content:

pasting said content within a document, and concurrently with said pasting, inserting said bibliographical information into a bibliographical section within said document;

responsive to a later storage of said document having said copy of said content, saving said document along with said bibliographical information, wherein said copy of the content is stored with the bibliographical information linked thereto;

concurrently deleting the copy of the content in response to detection of a deletion of the bibliographical information.

3. The method of claim 2, further comprising:

requesting user selection of whether said bibliographical information should be inserted within the bibliographical section; and in response to receiving a user selection to insert said information, updating a bibliographical section with said information, wherein when said user does not select insertion of said bibliographical information, said bibliographical section is not updated with said bibliographical information.

4. The method of claim 3, wherein said updating further comprises:

tagging the bibliographical information with an identifier;

displaying said identifier with said content, wherein the link between the bibliographical information and the content is indicated and selectable; and in response to the identifier being selected by a user, displaying the bibliographical information associated with the content.

5. The method of claim 2, further comprising:

requesting user selection whether said bibliographical information is to be edited before insertion within the bibliographical section.

6. The method of claim 5, further comprising:

enabling the user to delete portions of said bibliographical information; and when a specified portion of said bibliographical information is designed for non-deletion, disabling a delete option for that specified portion.

7. The method of claim 6, further comprising automatically deleting said content from said document when the specified portion of the bibliographical information is deleted.

8. The method of claim 1, wherein said associating step includes:
generating the content utilizing meta data; and
associating the bibliographical information as meta tags within said meta data.

9. The method of claim 1, said bibliographical information including one or more data from among name of author, source of content, publishing company, publication date, hot link to original article/document, and page and line numbering information.

10. The method of claim 1, wherein said associating step comprises:
generating the content utilizing meta data; and
respectively associating a beginning and an ending comment before and after said content;
wherein said beginning comment introduces and provides the bibliographical information for the content sequentially following in the source code and the ending comment terminates the section of overall content to which said bibliographical information belongs.

11. In a data processing system having a processor and program code residing in a memory and executing on the processor, a method for protecting online content the method comprising:
placing the content within a source file of a web page;
associating a bibliographic identifier with said content, wherein said bibliographic identifier is linked to said content such that a copying of said content when said web page is published copies said bibliographic identifier along with said content;
associating a deletion of the bibliographical identifier to a concurrent deletion of the content, wherein the deletion of the bibliographical identifier triggers a concurrent deletion of the content; and
responsive to an output of the content to an output device, automatically outputting the bibliographical information along with the content.

12. The method of claim 11, wherein said bibliographic identifier is a pair of comments comprising a first comment having the bibliographical identifier and a second comment indicating an end of the content to which said bibliographical identifier applies.

13. The method of claim 11, wherein said bibliographic identifier includes meta tags linked to bibliographical data, said method further comprising preventing a deletion of the bibliographical identifier without first deleting the content.

14. The method of claim 11, further comprising selecting at least one level of deletion capability for said bibliographic identifier, wherein a first level allows a copying entity to separate and delete bibliographical data from said content and a second level prevents removal of said bibliographical data by said copying entity.

15. The method of claim 11, further comprising enabling a copy tracking mechanism within said bibliographic identifier, wherein an internet identification (ID) of a copying entity that copies said content is recorded at a computer on which said web page is hosted.

* * * * *